(12) United States Patent
Morishita

(10) Patent No.: US 7,755,311 B2
(45) Date of Patent: Jul. 13, 2010

(54) FAN ABNORMALITY DETECTION DEVICE

(75) Inventor: Isaya Morishita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 353 days.

(21) Appl. No.: 11/725,451

(22) Filed: Mar. 20, 2007

(65) Prior Publication Data

US 2008/0007297 A1 Jan. 10, 2008

(30) Foreign Application Priority Data

Mar. 22, 2006 (JP) .............................. 2006-079299

(51) Int. Cl.
*H02H 7/08* (2006.01)
(52) U.S. Cl. .................. 318/400.21; 318/471; 318/782; 318/783; 361/24
(58) Field of Classification Search .................. 318/471, 318/139, 720, 721, 723, 798, 799, 400.01, 318/400.07, 400.1, 400.21, 400.22, 400.42, 318/708, 782, 783; 361/23–25
See application file for complete search history.

(56) References Cited

U.S. PATENT DOCUMENTS

| | | | |
|---|---|---|---|
| 4,611,154 A * | 9/1986 | Lambropoulos et al. .... | 318/490 |
| 6,054,823 A * | 4/2000 | Collings et al. ......... | 318/400.04 |
| 6,271,638 B1 * | 8/2001 | Erdman et al. ......... | 318/400.01 |
| 6,551,065 B2 * | 4/2003 | Lee .............................. | 417/32 |
| 6,731,082 B2 * | 5/2004 | Pelonis ................... | 318/400.26 |
| 6,997,684 B2 * | 2/2006 | Hahn et al. ................. | 417/44.1 |
| 2007/0236846 A1 * | 10/2007 | Chiu et al. ..................... | 361/78 |

FOREIGN PATENT DOCUMENTS

| | | | |
|---|---|---|---|
| JP | H03-168991 A | | 7/1991 |
| JP | 03226288 A | * | 10/1991 |
| JP | 04304115 A | * | 10/1992 |
| JP | H04-339196 A | | 11/1992 |
| JP | H04-359623 A | | 12/1992 |
| JP | 07-295098 | | 11/1995 |
| JP | 2003-130409 A | | 5/2003 |
| JP | 2005-107276 | | 4/2005 |

* cited by examiner

*Primary Examiner*—Walter Benson
*Assistant Examiner*—Eduardo Colon
(74) *Attorney, Agent, or Firm*—Pillsbury Winthrop Shaw Pittman, LLP

(57) ABSTRACT

When a fan drive current has become excessive, a fan drive device intercepts that current, waits for just a fixed time period T1, and thereafter flows that current for a second time. The fan power supply current flowed to the fan drive device is detected by a shunt resistor R. The value of the fan power supply current detected by the shunt resistor R is inputted to a controller, and the cause of any abnormality of the fan is decided upon by this controller, based upon the magnitude of the above described fan power supply current and the time period over which it has continued.

3 Claims, 3 Drawing Sheets

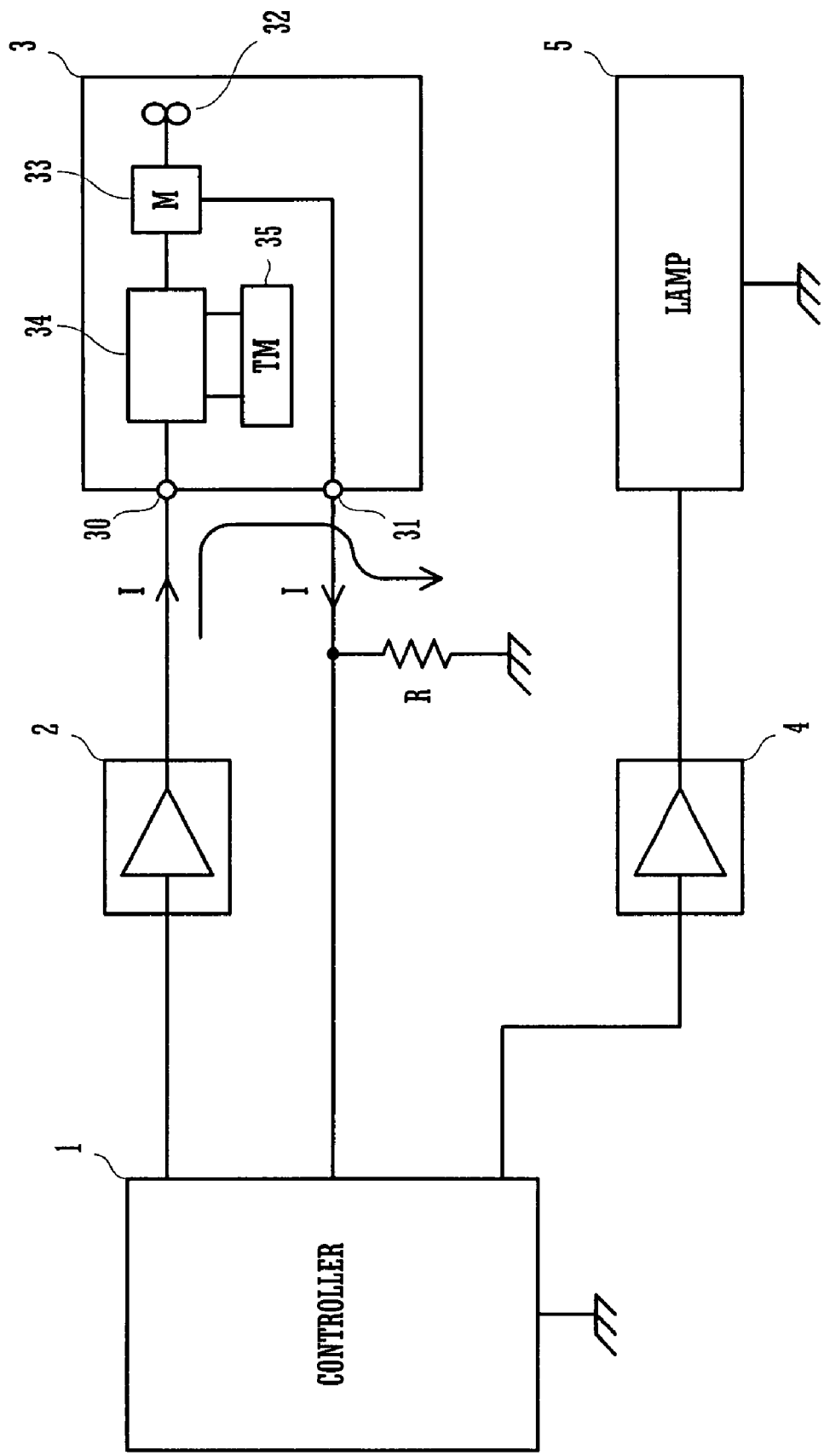

FAN ABNORMALITY DETECTION DEVICE

CROSS REFERENCE

This Nonprovisional application claims priority under 35 U.S.C. §119(a) on Patent Application No. 2006-079299 filed in Japan on Mar. 22, 2006, the entire contents of which are hereby incorporated by reference.

BACKGROUND OF THE INVENTION

The present invention relates to an abnormality detection device for a fan which cools a lamp or a board of a liquid crystal projector or the like.

Various types of abnormality detection device for a fan which cools a lamp or a board in a liquid crystal projector or the like have been proposed in the prior art.

For example, with the device disclosed in Japanese Laid-Open Patent Publication 2005-107276, there are included a temperature sensor which detects that the temperature has risen to an abnormally high level, and a rotation sensor for the fan, and predetermined abnormality processing is performed for detecting an abnormal state of the fan, based upon the signals detected by those sensors. Moreover, with the device disclosed in Japanese Laid-Open Patent Publication Heisei 7-295098, an abnormal state of the fan is detected based upon the output of a rotation detector of the fan.

However, in the case of both of the devices disclosed in the documents described above, it is detected whether or not the rotation of the fan stops, but the cause of this stopping is not detected. Furthermore, it also has not been possible to detect a situation such as one in which the fan is loose and slipping, or a vane has broken off, or the like.

Since, in this manner, with fan abnormality detection devices such as have been proposed in the prior art, the cause for the rotation of the fan stopping and the detailed situation have not been detected, accordingly there has been the problem that, when an abnormality has been detected, it is not possible easily to ascertain the cause of this abnormality.

The object of this invention is to provide a fan abnormality detection device which detects the state of abnormality of the fan in detail, and with which countermeasures corresponding thereto become simple and easy.

SUMMARY OF THE INVENTION

The fan abnormality detection device of this invention includes a fan for cooling an electronic device, and a fan drive circuit which controls a fan drive current so that the temperature of the electronic device does not attain a high temperature, and which, when the fan drive current has become excessive, cuts off the fan drive current, waits for just a fixed time period T1, and thereafter flows the fan drive current again.

Moreover, the fan abnormality detection device of this invention includes a fan power supply current detection sensor which detects a fan power supply current supplied to the fan drive circuit.

Yet further, the fan abnormality detection device of this invention includes a first decision means which decides that the fan is in a locked state or a short circuited state, when it is detected by the fan power supply current detection sensor that a fan power supply current of a first current value I1 which flows in the fan locked state has continued over a time period T3 which is less than or equal to the fixed time period T1, and a second decision means which decides upon a circuit open state due to breakage of a wire or coming off of a connector or the like, when it is detected by the fan power supply current detection sensor that a fan power supply current of a second current value I2 which flows to the fan in a state in which its current input circuit is in the disconnected state has continued over a time period T4 which is greater than or equal to the fixed time period T1.

With the fan abnormality detection device of this invention, the magnitude of the fan power supply current which is being supplied by the fan drive circuit is detected by the fan power supply current detection sensor. And a decision as to the "locked state or the short circuited state" or the "circuit open state" is made based upon this magnitude of the fan power supply current which has thus been detected, and the time period that it has continued. By doing this, it is possible to make a decision as to the detailed cause of the abnormality state.

BRIEF DESCRIPTION OF THE DRAWINGS

FIG. 1 is a structural diagram showing the principal portion of an abnormality detection device for a fan, which is an embodiment of the present invention;

FIGS. 2A and 2B are figures for explanation of a method of detecting a locked state and so on.

DETAILED DESCRIPTION OF THE INVENTION

Figure 2A:
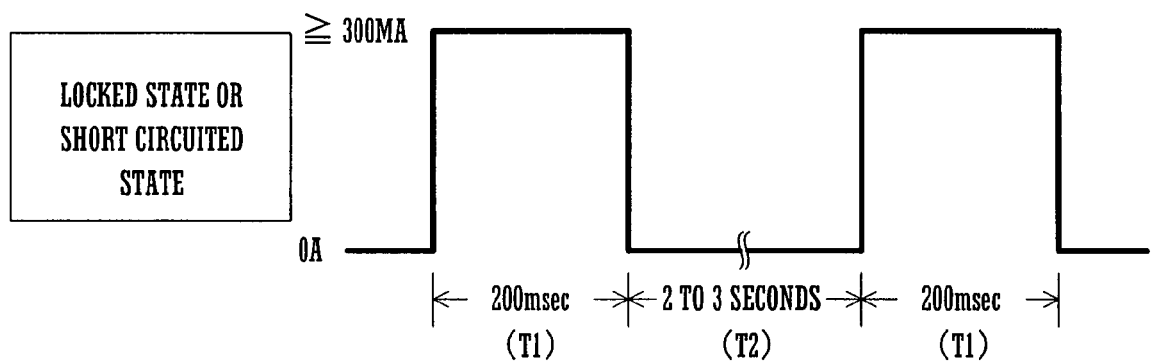

FIG. 1 shows a structural diagram of an abnormality detection device for a fan, which is an embodiment of the present invention. This abnormality detection device for a fan is provided to an electronic device such as a projector or the like, inside which is housed a heat generating unit (such as a lamp) which generates heat.

A fan power supply current is supplied from a controller 1 via a driver 2 to one power supply input terminal 30 of a fan drive device 3. The other power supply input terminal 31 of the fan drive device 3 is connected to ground via a shunt resistor R. The voltage between the ends of the shunt resistor R is inputted to the controller 1, and, because of this, the controller 1 is enabled to detect the magnitude of the fan power supply current which is being supplied to the fan drive circuit 3.

Furthermore, a lamp power supply current is supplied from the controller 1 via a driver 4 to a lamp 5.

The fan drive device 3 comprises a fan 32 for air cooling the lamp 5, a motor 33 which rotationally drives this fan 32, and a fan drive circuit 34 for driving this motor 33. A thermistor 35 is connected to the fan drive circuit 34, and, when the fan drive current flowing to the motor 33 has become excessive, detects that fact. By the operation of this thermistor 35, when the fan drive current which is flowing to the motor 33 has become excessive, this fan drive device 3 cuts off the current, waits for just a fixed time period T1, and thereafter restarts the motor 33 again. For example, if a foreign body becomes tangled up with the fan 32, then the fan 32 will go into a locked state. At this time, since an excessive current starts to flow to the motor 33, the motor 33 itself or some portion of the circuitry heats up abruptly, and this situation is detected by the thermistor, which cuts off the current. Although the motor 33 is restarted for a second time when the fixed time period T1 has elapsed, if the locked state is still continuing to occur at this time, then the current comes to be cut off for a second time. Due to this, provided that the locked state is not eliminated, the fan power supply current I which flows to the fan drive circuit 3 flows in the form of repeated pulses.

FIG. 2 shows the waveform of the fan power supply current in the locked state described above. In this example, when the locked state occurs, the fan power supply current substantially exceeds its rated current (which here is 200 mA) and becomes 300 mA or more. Furthermore, the time period T1 until the current which has reached this excessive current state (greater than or equal to 300 mA) is cut off is, in this example, 200 msec; and thereafter the fixed waiting time period T2 for which the system waits is 2~3 seconds.

Figure 2B:
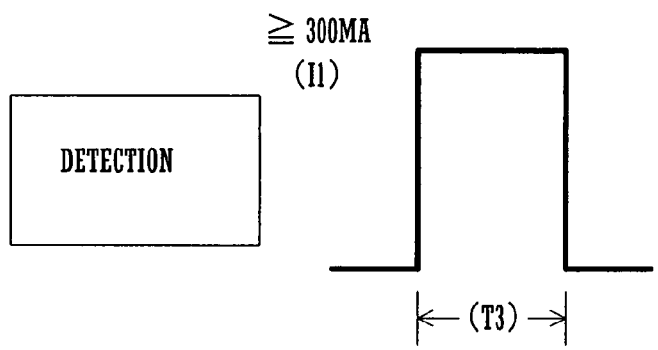

In this embodiment, the above described "locked state" or "short circuited state" is detected according to the magnitude of the fan power supply current which flows in the shunt resistor R, and according to the time period over which it continues. In other words when, as shown in FIG. 2B, a first current value I1 of greater than or equal to 300 mA is detected for a time period T3, then the "locked state" or the "short circuited state" is decided upon.

The magnitude of the above described current value I1 which is greater than or equal to 300 mA, is the measured value which flows to the fan 32 during the locked state. Furthermore, the time period T3 is set to be within the fixed time period T1 (200 msec); for example, it may be set to 100 msec. By setting the time period T3 to a length within the fixed time period T1 in this manner, it is possible reliably to detect the "locked state" or "short circuited state". If this time period T3 were to be set to greater than or equal to the fixed time period T1, then the fan power supply current would become zero while the time period T3 is still elapsing, as is clear from FIG. 2A. Due to this, it would become impossible to detect the "locked state" or the "short circuited state". Thus, as in this embodiment, the time period T3 is set to a length within the fixed time period T1, so that it is possible reliably to detect the above described state.

With the abnormality detection device of this embodiment, furthermore, when it is detected by the shunt resistor R that the magnitude of the fan power supply current I is a second current value I2, and that an current of this current value I2 has flowed for a time period T4, then a decision of "open circuit state" is made. This "circuit open state" is caused by a wire breaking or a connector coming off. The current value I2 is the value of the fan power supply current which flows when the current input circuit to the fan 32 is in the open state (the line interrupted state), and may, for example, be set to less than or equal 50 mA. Furthermore, the time period T4 may be any desired value, and may, for example, be set to 1 second.

With the abnormality detection device of this embodiment, yet further, when, in the state when the fan drive current should be at maximum, it is detected by the shunt resistor R that a third current value I3 which is less than or equal to the rated current for the fan power supply current has flowed for a time period T5, then a decision of "fan slipping" or "vane broken off" is made. This situation comes to pass when the controller 1 is trying to make the output of the fan 32 maximum. This type of situation occurs when some bearing in the fan has failed or a vane breaks off, and, as a result, the fan power supply current which is detected by the shunt resistor R does not attain the rated value. The above described current value I3 may be, for example, 170 mA, which is less than or equal to the rated current (200 mA), and the time period T5 may be, for example, 1 second.

According to the type of control described above, the controller 1 is able to decide upon the cause of an abnormality of the fan drive device 3 in detail, i.e. is able to decide whether the abnormality is due to a vane breaking off the fan 32, or is due to the failure of a bearing, or the like.

Figure 3:
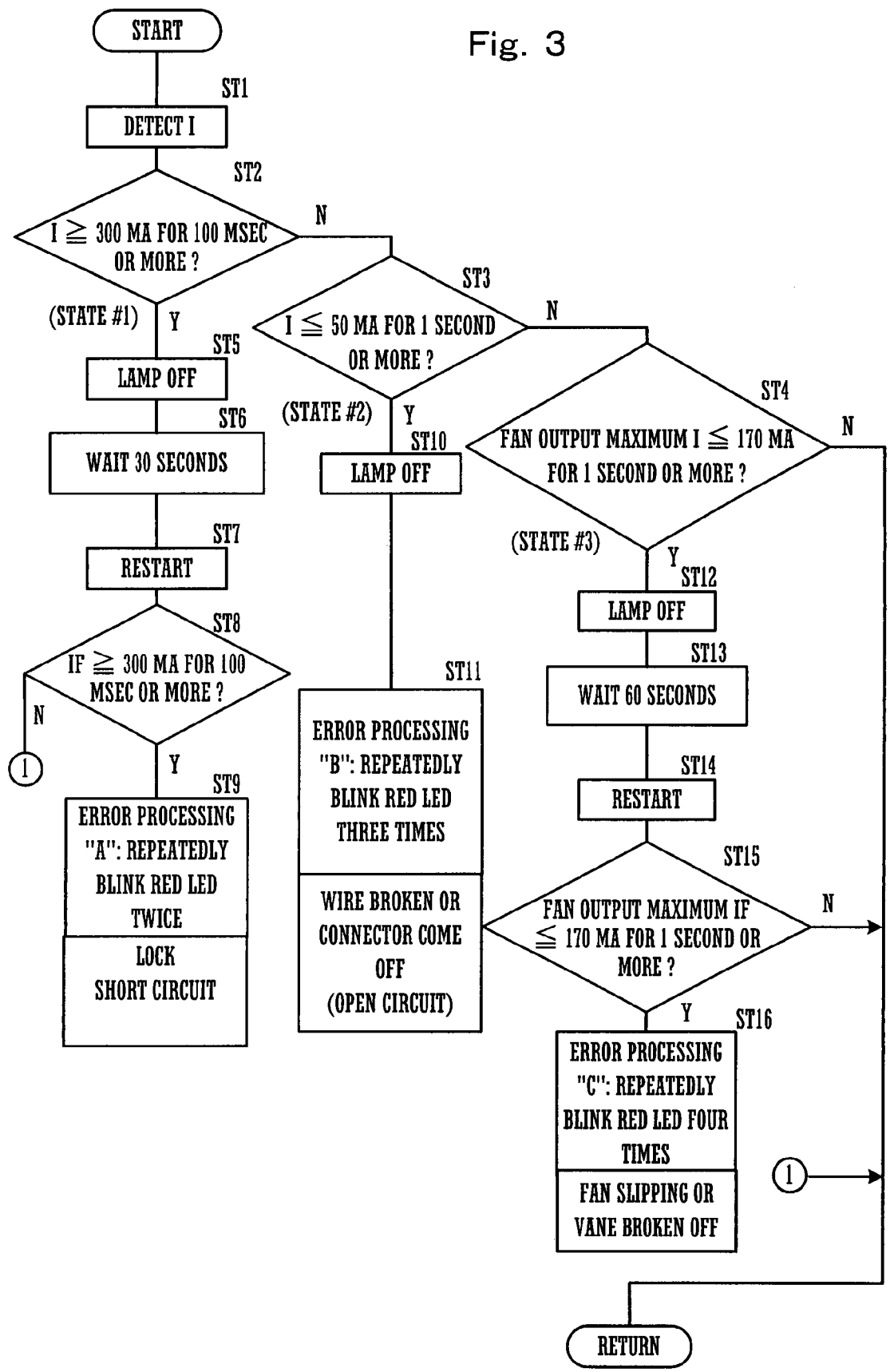
FIG. 3 is a flow chart schematically showing the operation of a controller 1.

FIG. 3 is a flow chart showing the sequence of control performed by the controller 1.

In a step ST1, the fan power supply current I is detected. It should be understood that this detection in the step ST1 is performed each time a fixed time period elapses, and the processing of the next step ST2 and subsequently is performed based upon this detected value.

The steps ST2 through ST4 are steps in which decisions are taken as to various abnormality states, based upon the magnitude of the fan power supply current which has been detected by the shunt resistor R, the time period over which this current has continued, and so on.

That is, in the step ST2, a decision is made as to whether or not a state in which the fan power supply current I is greater than or equal to 300 mA has continued for 100 msec or longer. If this condition is satisfied, then this is considered as being State #1.

And, in the step ST3, a decision is made as to whether or not a state in which the fan power supply current I is less than or equal to 50 mA has continued for 1 second or longer. If this condition is satisfied, then this is considered as being State #2.

Moreover, in the step ST4, a decision is made as to whether or not, although the condition holds that the fan output is being set by the controller 1 to its maximum state, a state in which the fan power supply current I is less than or equal to 170 mA has continued for 1 second or longer. If this condition is satisfied, then this is considered as being State #3.

(State #1)

In the state ST5, the lamp 5 is temporarily turned OFF, and then in the step ST6 the system waits for 30 seconds. Next in the step ST7 the system is restarted (the lamp is turned ON and also the fan drive device 3 is put into the state of being capable of operation). Next, in the step ST8, the same decision as in the above described step ST2 is performed for a second time. If in this step ST8 the condition is satisfied for a second time, then the flow of control proceeds to the step ST9 and error processing "A" is performed. In this error processing "A", a red colored LED which is provided to the actuation section of the projector is repeatedly blinked twice.

(State #2)

In the state ST10, the lamp 5 is turned OFF, and then in the step ST11 error processing "B" is performed. In this error processing "A", the red colored LED is repeatedly blinked three times.

(State #3)

In the state ST12, the lamp 5 is turned OFF, and then the system waits for 60 seconds in the step ST13. Then the system is restarted in the step ST14. Next, in the step ST15, the same decision as in the above described step ST4 is performed for a second time, and, if the condition is satisfied for a second time, then the flow of control proceeds to the step ST16 and error processing "C" is performed. In this error processing "C", the red colored LED is repeatedly blinked four times.

In the error processing "A" described above, by the fact that the red colored LED is blinking twice, the user is able to understand that the system is in the abnormal state of "locked state" or "short circuited state". And, in the error processing "B" described above, by the fact that the red colored LED is blinking three times, the user is able to understand that the system is in the "circuit open state" due to a wire having broken or a connector having come off.

Moreover, in the error processing "C" described above, by the fact that the red colored LED is blinking four times, the user is able to understand that the system is in the "slipping state" or the "vane broken state".

By the control described above, only by providing the simple shunt resistor R, the controller 1 is able to decide upon the cause of the abnormality state of the fan, and so on, in greater detail.

It should be understood that, instead of the shunt resistor R, it would also be possible to utilize a non contact type current detection sensor consisting of an air-wound coil or the like.

What is claimed is:

1. A fan abnormality detection device, comprising:
   a fan for cooling an electronic device;
   a fan drive circuit which controls a fan drive current so that the temperature of said electronic device does not attain a high temperature, and which, when said fan drive current has become excessive for a fixed time period T1, cuts off said fan drive current, waits for a time period T2, and thereafter allows said fan drive current to flow again;
   a fan power supply current detection sensor which detects a fan power supply current supplied to said fan drive circuit;
   a first decision means which determines that said fan is in a locked state or a short circuited state, when it is detected by said fan power supply current detection sensor that a fan power supply current of a first current value I1 which flows in the fan locked state has continued over a time period T3 which is less than or equal to said fixed time period TI; and
   a second decision means which determines an open circuit state, when it is detected by said fan power supply current detection sensor that a fan power supply current of a second current value I2 which flows to said fan in a state in which its current input circuit is in the disconnected state has continued over a time period T4 which is greater than or equal to said fixed time period TI.

2. The fan abnormality detection device of claim 1, further comprising a third decision means which decides that the fan is slipping or a vane has broken off, when it is detected by said fan power supply current detection sensor that, with the fan drive current being in its maximum state, a fan power supply current of a third current value I3 which is less than or equal to a fan rated current has continued over a time period T5 which is greater than or equal to said fixed time period TI.

3. The fan abnormality detection device of claim 1, wherein said fan power supply current detection sensor is a shunt resistor which is connected in series in a circuit in which said fan power supply current flows.

* * * * *